Oct. 31, 1939.  E. C. BLACKARD  2,177,633
METHOD AND APPARATUS FOR MAKING THERMOPLASTIC SHEETING
Filed Feb. 25, 1937
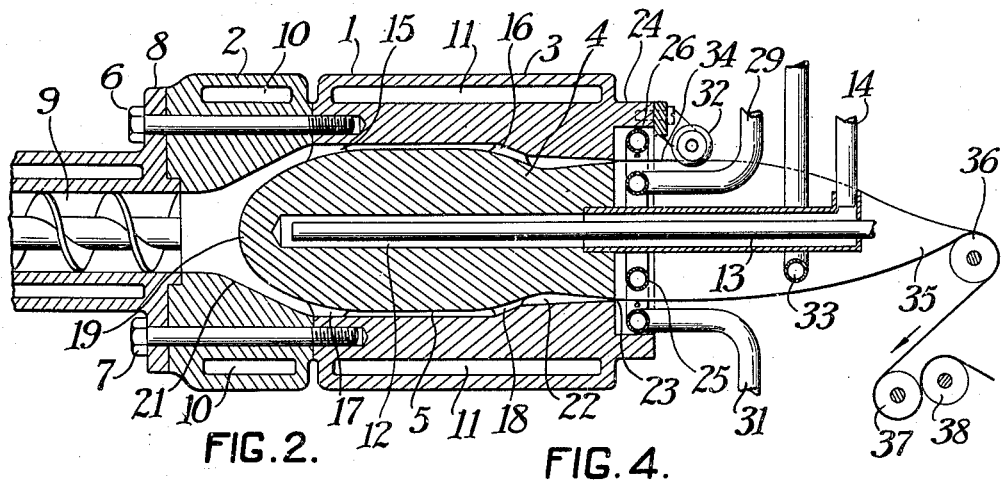
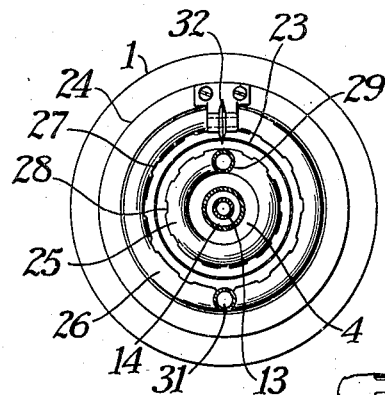
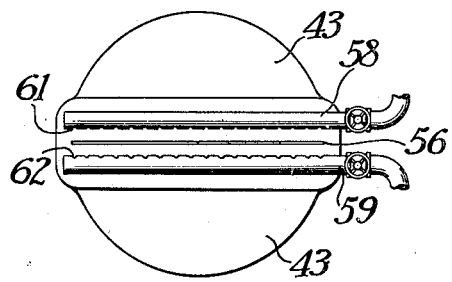
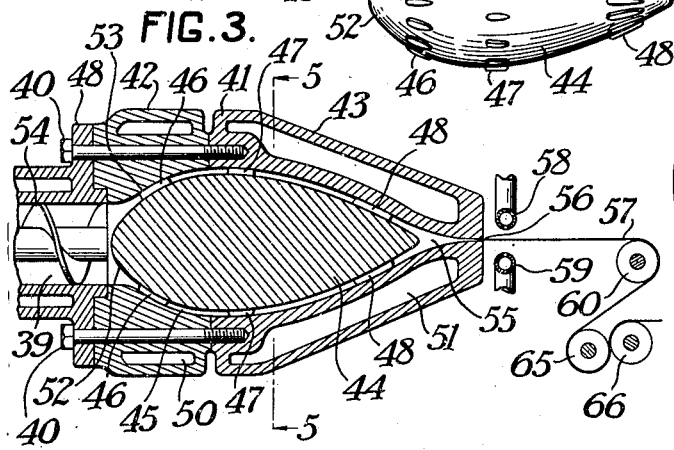
Ernest C. Blackard
INVENTORS
BY
ATTORNEYS Patented Oct. 31, 1939

2,177,633

UNITED STATES PATENT OFFICE 2,177,633

METHOD AND APPARATUS FOR MAKING THERMOPLASTIC SHEETING

Ernest C. Blackard, Kingsport, Tenn., assignor to Eastman Kodak Company, Rochester, N. Y., a corporation of New Jersey Application February 25, 1937, Serial No. 127,662

8 Claims. (Cl. 18—14)

This invention relates to processes and apparatus for the manufacture of sheeting or other thin films from thermoplastic materials and more particularly to the manufacture of relatively thin, transparent, and uniform sheets or slabs from thermoplastic molding compounds, such as cellulose acetate, cellulose propionate, ethyl and benzyl cellulose, and other organic derivatives of cellulose, and other suitable thermoplastic organic compounds for use in making laminated glass.

In the manufacture of such sheeting there are many factors which must be appreciated and controlled in order to produce a thermoplastic lamination which will not shrink and pull away from glass lamination after it has been cut to size and pressed therebetween. Such pulling or breaking away causes "blowins" and reduces the safety factor of the glass and distorts images viewed therethrough.

I have found that two such factors, the control of which is of prime importance, are the variance in supporting the sheet or tube when it is first extruded from an extrusion die orifice, and the vaporization and condensation of plasticizer fumes (from the plastic material) onto parts adjacent the orifice, causing drops to fall upon the tube or sheet in the vicinity of the die orifice. By permitting the hot plastic tube or sheet to be extruded without support immediately adjacent the die orifice, even though the tube or sheet is conducted away at a rate substantially equal to the extrusion rate, a sag and stretch is introduced therein which subsequently will, if not removed, cause a shrinkage of the plastic lamination when it is heated and pressed between layers of glass. I have also found that if plastic material from which the sheet is made contains a plasticizer which fumes slightly at the extrusion temperature, that such fumes tend to condense on the extrusion apparatus adjacent the die orifice and form droplets. These droplets will often drop onto the hot tube or sheet and dissolve a hole therethrough or produce a weak spot in the sheet owing to local concentration which subsequent heating and calendering will not satisfactorily remove.

An object, therefore, of the present invention is an improved method and apparatus for producing a thermoplastic, substantially uniform low-shrinking sheet.

Another object of the invention is a method and apparatus for manufacturing sheeting whereby the extruded tube or sheet is supported on a gas support and removed from the die without substantial strain or imparting appreciable stretch thereto.

Still another object is a method and apparatus for preventing weak spots in a sheet by eliminating condensation of fumes in the vicinity of the sheet.

Another object is a method of preventing sudden cooling and contraction of the thermoplastic tube or sheet as it leaves the die orifice.

A further object is a method of opening a slit thermoplastic tube by employing gas pressure. Other objects will appear hereinafter.

In accordance with one feature of the invention, these and other objects are attained by placing suitable gas supporting means adjacent a suitable extrusion die orifice whereby the extruded tube, sheet or other such article is supported immediately as it issues from the die on a suitable gas under pressure. This gas may also be at a temperature above the condensation point of the plasticizer contained in the sheet thereby preventing this condensation in the vicinity of the sheet.

In accordance with another feature of the invention, a fluid under pressure is impinged on the interior of the slit thermoplastic tube thereby causing it to flatten into a sheet.

In accordance with a further feature, the sheet is conducted away from the die at a rate substantially equal to the extrusion rate so that substantially no stretch is imparted thereto.

The invention will be more clearly understood from the following detailed description with reference to the attached drawing in which:

Fig. 1 is a diagrammatic side view in elevation of my improved apparatus for supporting an extruded thermoplastic article and preventing condensation of plasticizer thereon, and for spreading open the slit tube, associated with a suitable annular extrusion die assembly and a conveying mechanism for conducting the plastic material thereto;

Fig. 2 is an end view in elevation of the annular extrusion die of Fig. 1 showing the position of the gas jets in respect to the die orifice;

Fig. 3 is a diagrammatic side view in elevation of a suitable sheet extruding apparatus with my improved condensation preventing apparatus associated therewith;

Fig. 4 is an end view in elevation of the extrusion die shown in Fig. 3 with the associated gas jets placed adjacent the extruded sheet;

Fig. 5 is a cross section of the sheet extrusion die on the line 5—5 of Fig. 3 showing a multiplicity of core supporting members which also serve to conduct heat to the core;

Fig. 6 is a section of the core showing the relative spaced position of the streamline supporting members for the core.

As shown in Fig. 1 the annular extrusion die assembly 1 comprises two hollow members 2 and 3 and a core member 4 positioned in the hollow chamber 5. The members 2 and 3 are fastened together by suitable bolts 6 and 7 and member 2 is in close contact with the conveyor screw chamber 9 being bolted also by the bolts 6 and 7 to the flange 8 of the conveyor screw chamber 9. Members 2 and 3 have heating jackets 10 and 11 through which suitable heating fluid may be passed, the conducting pipes not being shown.

The core 4 has a hollow center 12 which serves as an internal heating chamber into which a heating fluid may be conducted through inflow pipe 13 and removed by outflow pipe 14. The core 4 is of smaller diameter than the chamber 5 formed by members 2 and 3 so that there is a clearance therebetween. The core 4 is centered on a plurality of integral supporting members some of which are shown at 15, 16, 17, and 18 and which are spaced so that the plastic material may flow between them; preferably as indicated in the drawing, they are of a stream line contour so that the plastic mass although divided by them tends to flow together again without having open spaces in the onflowing mass which might seriously interfere with the production of a uniform sheet.

The head 19 of the core 4 is of a blunt shape and the inner adjacent wall 21 of member 2 is conical so that the material being forced into the chamber is uniformly divided around the core head into a thin layer and a uniform cylinder of plastic material is caused to begin to flow along through the heating chamber. To further insure a uniform and compact mass after the plastic is divided by the stream lined members 15, 16, 17, and 18 before the plastic mass is extruded from the die, a hollow circular cavity 22 is formed in the core 4 near the output end. This causes a final commingling of the plastic as it is forced along to the narrowed tubular die orifice 23.

As shown in Fig. 1, and more clearly in the end elevational view in Fig. 2, the end of the extrusion die assembly 1 has a tubular extension 24 beyond the die orifice and a pair of concentric gas jets 25 and 26 are mounted therein above and below the orifice of the die. The gas jets may be annular pipes having a plurality of holes 27 and 28 appropriately positioned therein so that the outflowing gas will impinge on the extruded sheet. Conduit pipes 29 and 31 connected to a suitable source of gas, not shown, supply gas to the respective jets under pressure. The gases released by these pipes may, of course, be the same or different gases, and may be at different temperatures and pressures. Any gas such as air, nitrogen, etc. may be used preferably the gas employed is one which has no disadvantageous action on the sheet and is more or less inert in respect thereto. They serve to furnish a fluid support and a heating medium for carrying away substances which tend to condense on the apparatus and drop on the tube or sheet adjacent the die opening. The support and temperature action of the gas on the extruded sheet minimize the introduction of strains and give a temperature gradient which prevents sudden cooling of the sheet with consequent strains.

A slitting mechanism comprising a revolving circular knife 32 is positioned adjacent and above the die orifice 23 where it slits the extruded tube 34 soon after it leaves the orifice 23.

An additional annular gas jet 33 is placed in spaced relationship to the knife 32 and the pair of concentric jets 25 and 26 and in a plane therein so that as the slit tube is carried along the gas impinging on its interior will tend to flatten it out into a sheet 35 without any mechanical device touching it. This gas is also heated so as to prevent condensation of plasticizer fumes on the pipe lines 13 and 14 which would tend to drop onto the sheet. The sheet 35 is conducted away from the die over guide roll 36 and between driven rolls 37 and 38 which are driven at a rate substantially equal to the rate with which the plastic is forced through the die. This will assure that substantially no tension is exerted in the tube and sheet and no appreciable stretch is imparted thereto.

If desired to further support the plastic sheet, another and larger annular ring may be placed outside the plastic sheet with jets jointing inwardly, the ring preferably being concentric with the ring 33. Also further sets of gas rings may be spaced between rings 25 and 33 or beyond ring 33. Or further gas rings on the outside of the sheet alone (like ring 26) may be spaced along the sheet to give it further fluid support from the outside or underside of the sheet, such rings being shaped to conform approximately to the shape of the sheet at that point. The plasticizer fumes which are dissipated by the gas from the rings 25, 26, 33 and the like may, of course, be collected by providing a suitable hood, which has a slight suction therein to pull away the fumes.

As shown in Fig. 3 my invention may also be applied to a die having a straight orifice. The extrusion die assembly 41 in this figure comprises two hollow members 42 and 43 and a core member 44 positioned in the hollow chamber 45. The members 42 and 43 are fastened together by suitable bolts as shown at 40 and member 42 is in close contact with the conveyor screw chamber 39 being bolted also by the bolts 40 to the flange 48 of the conveyor screw chamber 39. Members 42 and 43 have heating jackets 50 and 51 through which suitable heating fluid may be passed, the conducting pipes not being shown.

The core 44 does not have a hollow center which serves as an internal heating chamber but is heated from the external heating chambers 50 and 51 by heat conduction through the plurality of supporting members some of which are shown at 46, 47, and 48, and which are spaced and staggered so that the material may flow between them. The core 44 is of smaller diameter than the chamber formed by members 42 and 43 so that there is a clearance therebetween. These supporting members are also of stream line contour so that the plastic mass although divided by them tends to flow together again without having open spaces in the onflowing mass which would likely interfere with the production of a uniform sheet.

The head 52 of the core member 44 is of a stream line shape and the inner wall 53 of the member 42 is a complement of this shape so that the material being forced into the chamber by the screw 54 is uniformly divided around the core head and a uniform cylinder of plastic material is caused to begin a flow along through the heating chamber 45. To further assure the presence of a uniform and coherent mass after the plastic is divided by the stream lined members 46, 47, and 48, an auxiliary chamber 55 is formed immediately before the die orifice 56. This permits the plastic material to commingle due to the forward pressure of the feeding mechanism and the back pressure of the die orifice and a substantially uniform sheet 57 is extruded through the orifice 56.

As shown in Fig. 3, and more clearly in Fig. 4, at the end of the extrusion die assembly 41 is placed a pair of parallel positioned gas jets 58 and 59 having a plurality of suitable holes 61 and 62 therein from which gas may be forced under pressure to impinge on the sheet 57. These jets may be held in position by any suitable means, not shown. The sheet 57 may be conducted away from the die over a guide roll 60 and the driven rolls 65 and 66 which are preferably driven at a rate substantially equal to the rate at which the sheet is extruded, hence, substantially eliminating the introduction of tension in the sheet.

As stated in connection with Fig. 1 the gas prevents the sheet from sagging as it comes out of the orifice and prevents condensation of fumes on the apparatus in the vicinity of the sheet and dropping on the sheet itself.

Referring to Fig. 5 there is shown a cross section of the die assembly of Fig. 3 taken on line 5—5 showing the core 44 centered in the die assembly chamber on its plurality of supporting members 47. This multiplicity of supporting members also are heat conducting bridges which conduct heat from the heat jackets 50 and 51 to the core 44. The layer of plastic material flowing between the core and the die walls will, therefore, be thoroughly heated by both surfaces as well as from the direct contact with the bridges.

Fig. 6 is a side view of a section of the core 44 showing the plurality of stream line supports 46, 47, and 48 which are in staggered relationship.

While it will be understood that any thermoplastic composition suitable for making a thermoplastic sheet may be employed, I prefer to employ compositions made in accordance with the method described and claimed in the copending application of E. C. Blackard and J. H. Waterman, Serial No. 127,660 entitled, "Method of plasticizing thermoplastic materials," of even date.

The plastic composition may be introduced into the feed chamber 9 in conventional manner wherein it is colloidized by heat and from whence it is forced around the core 4 and through the annular orifice 23. It may be preferably, however, to extrude the sheeting by means of a device such as described in Kimble and Blackard application Serial No. 127,661 filed of even date, with which device may be associated the gas jets disclosed herein, such association being substantially as above illustrated.

If an annular die such as that shown in Fig. 1 is employed, the material is extruded in the form of a tube 34 and is cut by the knife 32. The die is preferably heated to approximately 145° C. On passing out of the orifice it is supported substantially equi-distantly between the jets 25 and 26 by a fluid under pressure, preferably air or other inert gas, heated to about 145° C. This prevents the hot plastic sheet from sagging and increasing its length due to lack of support immediately outside the die. The heated air being at a lower temperature than the die also provides a more gradual temperature gradient than has heretofore been employed in making such sheeting which has often been extruded out of the die into atmospheres of varying temperatures dependent on that of the room in which the apparatus is placed. Such changes may be greater than 75° C. and this abrupt drop in some cases causes shriveling and contraction of the tube or sheet, particularly on its surface. The sheet 35 which is passed over guide roll 36 is formed from the cut tube 34 and is spread open by gas, preferably air, issuing from the tubular jet 33, which is also heated to 145° C. The heated air flowing from the three jets removes any plasticizer fumes from the vicinity of the die orifice and sheet, thereby preventing drops of the condensed fumes from falling on the hot sheet and making holes therein. The sheet 35 is conducted away from the die by means of cooperating rolls 37 and 38 which are driven by any suitable means (not shown) at a rate substantially equal to the rate at which the sheet is extruded from the die. This further prevents the introduction of residual strains in the sheet which, on heating, as during the manufacture of laminated glass, will produce shrinkage.

If the composition is extruded into a sheet, as shown in Fig. 3, it will be thoroughly heated in the die by the cooperation of the heating jackets 50 and 51, the heated core 44 and the multiplicity of core supporting members 46, 47, and 48. Immediately before being extruded into a sheet, it will be thoroughly commingled in the chamber 55. On leaving the die the sheet will be supported by air flowing from jets 58 and 59 and will be conducted away by rolls 60, 65, and 66 without any appreciable stretch being imparted thereto. Condensation of any of the plasticizer fumes will be prevented by the action of the heated air. The sheet may be further processed or wound up on suitable reels if desired.

While the prevention of condensation of any plasticizer fumes which may occur in the vicinity of the extrusion orifice is extremely important, I do not wish to give the impression that any extensive loss of plasticizer from the sheeting occurs. While water is known to boil at 100° C. it is likewise equally well known that water evaporates slowly at lesser temperatures. Similarly, while the plasticized composition is never heated (in my process) to the boiling point of the plasticizer, none the less, as the sheet leaves the extrusion orifice it is hot enough that a small fraction of the plasticizer fumes away from the sheet. Obviously, after the process is run for several minutes these fumes will condense into droplets, which, as they grow big enough, will drop onto the sheet with consequent damage. By preventing this condensation I prevent consequent damage to the sheeting from droplets falling thereon. The plasticizer is properly termed non-volatile, because at atmospheric temperatures its volatility is inappreciable.

By employing my invention I can produce a very uniform thermoplastic sheet which is especially suited for use in making laminated glass, being substantially without residual strain and exhibiting low shrinkage.

What is claimed is:

1. The method of making organic thermoplastic articles which comprises forcing an organic thermoplastic material through a die, continuously conducting the extruded article away from the die under a tension less than that sufficient to support the weight of the article between the die and the conducting means, and supporting the article by impinging gases thereon.

2. The method of making thermoplastic articles which comprises forcing an organic thermoplastic material through a heated annular die, continuously conducting the hot hollow extruded article away from the die under a tension less than that sufficient to support the hollow article between the die and the conducting means, and supporting the article by impinging gases on the interior and exterior of the article at a point immediately adjacent the die orifice.

3. The method of making thermoplastic sheeting which comprises forcing a cellulose organic derivative plastic material through an annular die to form a tube, continuously conducting the extruded tube away from the die under a tension less than that sufficient to support the tube, and supporting the tube in the vicinity of the die orifice and between the die and the conducting means impinging gases on the interior and exterior of the tube at a point immediately adjacent the die orifice.

4. The method of making a thermoplastic sheeting which comprises forcing a cellulose organic derivative plastic material through a tube forming die, continuously conducting the extruded tube away from the die under a tension less than that sufficient to support the tube between the die and the conducting means, supporting the tube by impinging gases on the interior and exterior of the tube, slitting the tube along the length immediately adjacent the gaseous support to form a sheet, and spreading the slit tube into a sheet by a flow of gas under pressure remote from said die.

5. The method of making a thermoplastic sheeting from a cellulose organic derivative plastic material containing a solvent plasticizer which comprises extruding the plastic material through a suitable die, continuously conducting the extruded sheet away from the die under a tension less than that sufficient to support the sheet, supporting the sheet by impinging heated gases on the sheet between the die and the conducting means which gases are above the condensation point of any of the plasticizer fumes thereby preventing sagging of the tube and preventing weak spots therein due to condensation of said fumes on the tube, and slitting the tube to form a sheet.

6. In apparatus for making thermoplastic articles, a die assembly, means for forcing an organic thermoplastic material therethrough, and means comprising gas jets for supplying gas under pressure for supporting the extruded sheet immediately adjacent the die orifice.

7. In apparatus for making thermoplastic articles, a die assembly including an annular die orifice, means for forcing organic thermoplastic material therethrough to form a tubular article, concentric gas jets positioned inside and outside said tube whereby the position of the tube is located by the force of the gas flowing through the jets.

8. In apparatus for making thermoplastic sheeting, a die assembly including an annular orifice, means for forcing cellulose organic derivative plastic material therethrough to form a tube, gas jets positioned in close proximity to the orifice for impinging gas thereon, means for slitting the tube, and further gas-directing means associated with the apparatus for spreading the slit tube into a sheet by means of gas pressure.

ERNEST C. BLACKARD.